Figure 1:
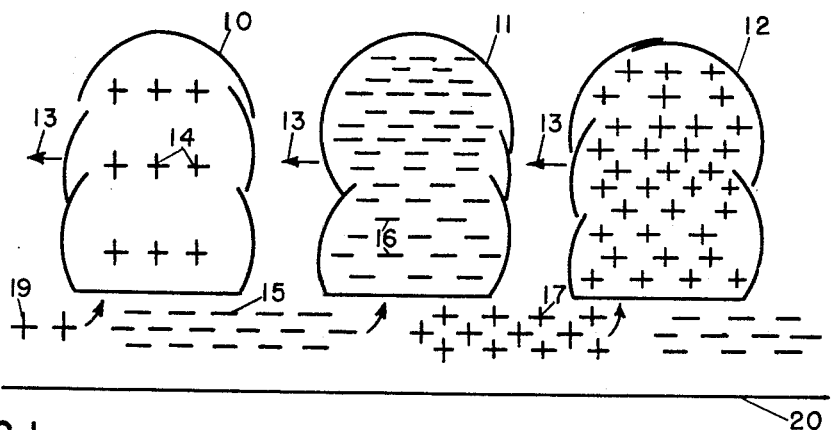

Feb. 6, 1962 B. VONNEGUT 3,019,989
ATMOSPHERIC SPACE CHARGE MODIFICATION
Filed April 5, 1954 3 Sheets-Sheet 1

*INVENTOR.*
BERNARD VONNEGUT
BY
AGENT

Feb. 6, 1962        B. VONNEGUT        3,019,989
ATMOSPHERIC SPACE CHARGE MODIFICATION
Filed April 5, 1954        3 Sheets-Sheet 2

*INVENTOR.*
BERNARD VONNEGUT
BY
AGENT

INVENTOR.
BERNARD VONNEGUT
BY
AGENT

United States Patent Office 3,019,989
Patented Feb. 6, 1962

3,019,989
ATMOSPHERIC SPACE CHARGE MODIFICATION
Bernard Vonnegut, North Scituate, Mass., assignor to Arthur D. Little, Inc., Cambridge, Mass., a corporation of Massachusetts
Filed Apr. 5, 1954, Ser. No. 421,154
10 Claims. (Cl. 239—2)

This invention relates to method and means for modifying the existing space charge of the atmosphere over the earth's surface or over selected areas thereof. In particular, this invention is concerned primarily with the minimization or elimination of severe or catastrophic electrical disturbances in the atmosphere, more specifically thunderstorms or tornadoes, and also with the production or the intensification of such disturbances.

As is known, the earth has a negative charge amounting to around 400,000 coulombs. The ionosphere, on the other hand, is positively charged, so that we may consider that the earth and the ionosphere form the two plates or electrodes of a gigantic condenser, with the atmosphere between. The potential gradient between these two plates or electrodes is some 400,000 volts. While both of these plates or electrodes are relatively good conductors of electricity, the atmosphere between is by no means a poor conductor. It has in fact been calculated that the earth as a whole is leaking charge toward the ionosphere at the rate of 1800 amperes, and that if this charge were not being replenished, the earth would lose around 90% of its charge within an hour. The atmosphere is in fact sufficiently ionized to permit this leakage of the earth's charge.

In 1920, C. T. R. Wilson, the inventor of the cloud chamber, suggested the mechanism by which the earth's charge is constantly replenished. He postulated that the thunderstorms which are scattered over the earth at any one time form a sort of battery of cells in parallel, supplying negative charges to the earth from their bottom regions (as by lightning), and positive charges to the ionosphere from their tops, which extend upward into the ionosphere region. Measurements and calculations carried out by C. H. Gish [1] and C. R. Wait of the Carnegie Institution have shown that the average current above each active thunderstorm region is approximately one-half ampere. Since this current eventually serves to neutralize the 1800 ampere charge leaking from the earth, referred to above, there should be something in the order of 3600 (i.e. 1800 divided by ½) active thunderstorm regions scattered over the earth's surface at any given time. Estimates indicate that this is actually so.

While the foregoing statements may not be regarded as completely proven in all respects, they provide a reasonable basis of explanation for the existence and maintenance of the respective charges of the earth and the ionosphere.

In order to provide background for a better understanding of my invention, I shall first present my hypothesis with respect to the formation of thunderstorm electricity. While my calculations and experimental work indicate that this hypothesis provides a reasonable explanation, I wish it to be clearly understood that this invention is not dependent upon the complete accuracy of this or any other hypothesis.

According to this hypothesis, the accumulation of charge which eventually results in lightning strokes is brought about primarily by up drafts and down drafts of air that contains space charge. This space charge consists of ions of low mobility produced by the capture of fast, small ions by larger particles, such as Aitken nuclei, or in some cases, cloud drops, ice crystals, hail particles, or rain drops. The normal atmospheric concentration of space charge is not nearly large enough to account for the currents known to exist in thunderclouds. Therefore, a primary object of the hypothesis is to explain how space charges sufficiently large to give lightning might be produced.

The measurements of Kähler,[2] Brown,[3] Scrase,[4] and Obolensky [5] have shown that the normal space charge of the atmosphere at the earth's surface is of the order of from 6 to 1200 elementary positive charges per cc. As Chalmers points out in his book "Atmospheric Electricity," [6] space charges of this magnitude must normally be confined to the lower regions of the atmosphere, otherwise the normal electric field would be far larger than the observed value of one or two volts per centimeter. However, under conditions of strong convective activity, such as those which produce thunderstorms, it frequently happens that large volumes of surface air containing positive space charge rise to form large clouds. A cloud about 10 km. in diameter and containing about 100 charges per cc. would have a charge of about 10 coulombs, and a field beneath it of about 10 volts per centimeter. Such a cloud would probably not be capable of producing lightning, but such a cloud could produce air masses containing far larger quantities of charge, which in turn can result in lightning. The processes by which this can take place are similar to those of a familiar experiment in electrostatics: in the electrophorous it is possible by the application of mechanical work to use the small charge residing on a rubber plate to produce any desired quantity of charge. The mechanical energy necessary to produce large quantities of charge from the hypothetical colud is derived from the strong up drafts and down drafts that result from very unstable atmospheric conditions.

The initial cloud can produce large quantities of highly-charged air by two rather similar processes. The first of these occurs beneath the cloud where the field is now perhaps 10 volts/cm. instead of the usual 1 volt/cm. This increased field causes exposed points above the earth such as trees and buildings to give a corona discharge and emit into the atmosphere large numbers of high-mobility ions, of a charge opposite to that of the cloud. These ions move up toward the cloud but soon become attached to the large numbers of Aitken nuclei always present in the atmosphere, or perhaps to falling precipitation. This capture of the fast ions having mobilities of the order of 1 volt/cm./volt/cm. results in the production of a large space charge of low-mobility ions in the air beneath the cloud. If the air in the cloud and beneath it were motionless, this process could produce, at best, a quantity of space charge somewhat less than that in the original cloud. The space charge of the ions thus produced would reduce the gradient at the ground beneath the cloud so that corona would no longer take place. The ions would slowly migrate to the charged cloud and in time neutralize more or less of its charge. However, the atmosphere is far from motionless, particularly when the air is unstable. The velocity of the large ions under the influence of even powerful electric fields is small and negligible compared to the velocities of wind currents.

In general, the initial charged cloud will have a velocity relative to the ground, and also there will be a wind

[1] Gish, O. H., 1951: Universal Aspects of Atmospheric Electricity. Compendium of Meteorology, Am. Met. Soc., 101.

[2] Kähler, K., 1927: Die Electrische Raumladung der Atmosphäre in Potsdam, Met. Zeit. 44.
[3] Brown, J. G., 1930: Relation of Space Charge and Potential Gradient to the Diurnal System of Convection in Lower Atmosphere. Terr. Mag. and Atm. Elec., 35, 1.
[4] Scrase, F. J., 1933: Air Earth Current at Kew Observatory. Met. Off. Geophys. Mem. 58.
[5] Obolensky, W. N., 1925: Über Elektrische Ladungen in der Atmosphäre, Ann der Phys., 77, 644.
[6] Chalmers, J. A., 1949: Atmospheric Electricity, Oxford at the Clarendon Press.

at the ground. Because of these movements, the charged cloud can induce a total charge far greater than its own, and also produce a much higher concentration of space charge than that present normally. The highly-charged air thus produced in the lower atmosphere will be drawn into clouds, and these clouds in turn can produce even more space charge until lightning results.

The other process by which the original cloud of positive charge can produce more space charge takes place at the top of the cloud, which has risen to altitudes at which the air has far higher conductivity than at the earth's surface. Although the cloud has not produced the very high potentials characteristic of a thunderstorm, it nevertheless has a positive potential exceeding that of the ionosphere. Because of this potential difference, negatively-charged fast ions from the ionosphere move toward the cloud. However, here again, these ions on their way to neutralize the cloud are trapped by the large concentration of Aitken nuclei or cloud droplets present in the air of the cloud and in the air around it. The resulting slow negative ions thus formed are then either carried away by the high winds frequently present above the cloud or by strong down drafts around the cloud.

By processes such as these, large quantities of space charge of high concentration are continuously produced which provide the charging currents necessary for electrical storms.

Although the motions in a thunderstorm are quite variable and complicated, it is possible to give various simple illustrations of the foregoing hypothesis. These illustrations are included to suggest the sort of situations which lead to the formation of large charge centers capable of producing lightning. An explanation of these illustrations is provided in FIGS. 1 to 6B, inclusive.

FIG. 1 is an illustration showing three hypothetical thunderstorm cells 10, 11, and 12 moving along with the wind in the direction of arrows 13. Cloud 10 is the primary cloud, having a relatively small positive space charge 14. Because of the corona produced beneath it, this cloud leaves a layer of high negative space charge 15 beneath it which in turn is drawn into cloud 11. This cloud, having a high negative charge 16, produces a layer of high positive space charge 17 which enters cloud 12, and so on with successive clouds. The ground is represented by the numeral 20, in this and succeeding figures.

Figure 2:
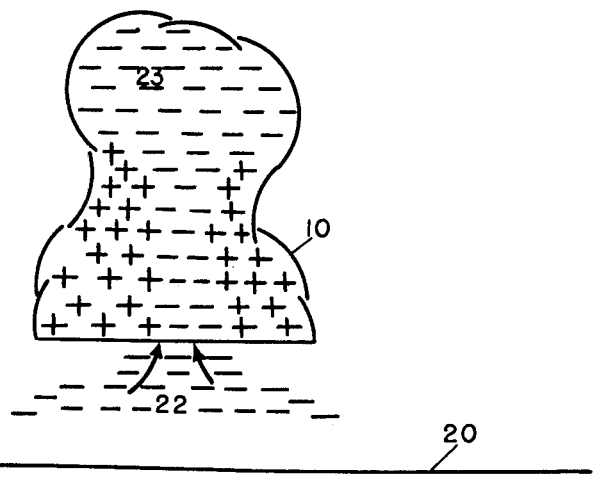

In FIG. 2, the original positive cloud 10 has grown large enough to produce corona at the ground 20 which is in this instance negatively charging the air 22 entering the cloud. This negatively-charged air is rising into and up through the cloud, to accumulate on the top, producing there a large charge center 23.

Figure 3:
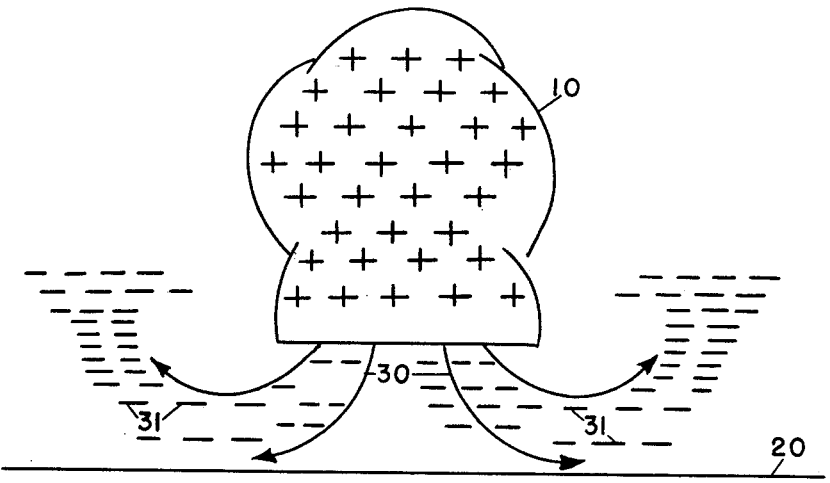

In FIG. 3, the initial positive cloud 10 is dissipating by strong down drafts 30. As the air comes out of the cloud along the ground 20, it acquires a strong negative charge 31.

Figure 4:
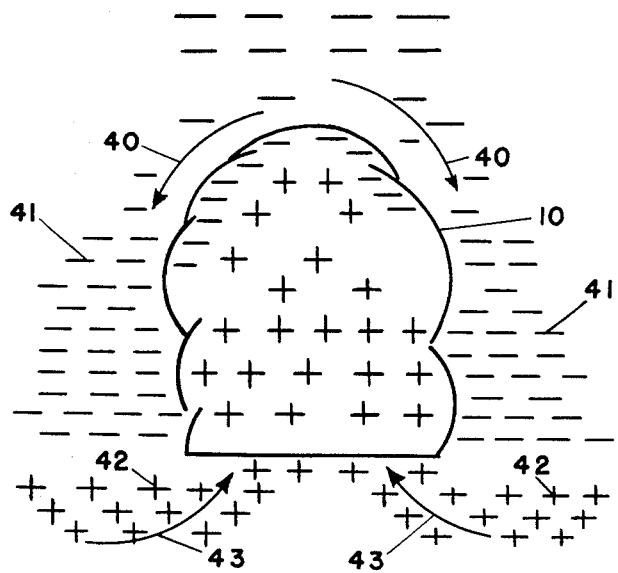

FIG. 4 illustrates an initial positive cloud 10 which is producing all around it strong down drafts 40 of negative space charge 41 which are forming a ring of high negative charge around it. This negative charge has accumulated to the point that it is producing strongly-positive air 42 at low levels, which is entering the cloud as indicated by arrows 43.

Figure 5:
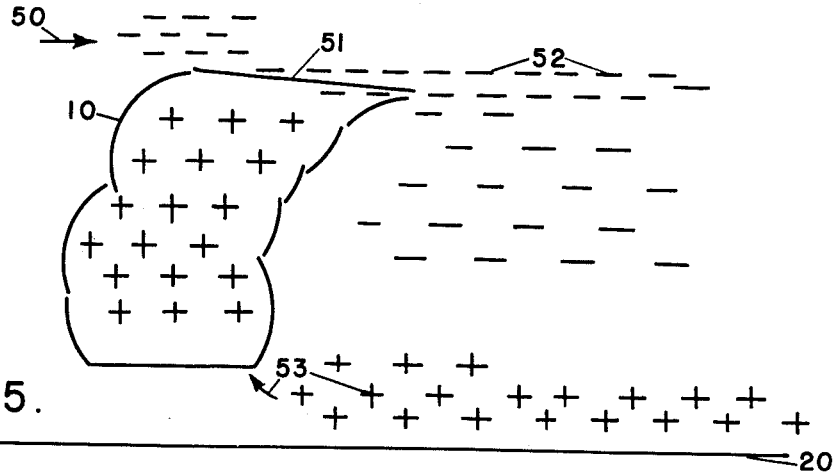
Figure 6:
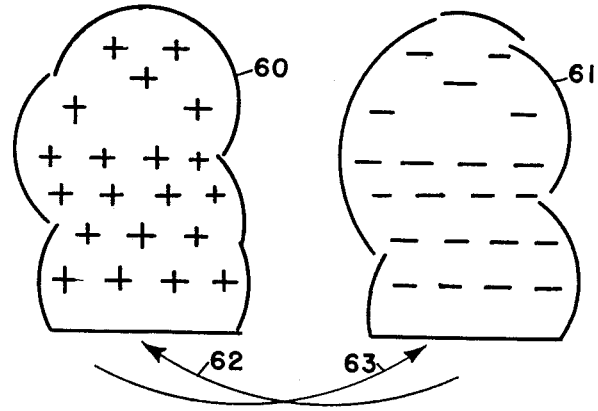
Figure 6:
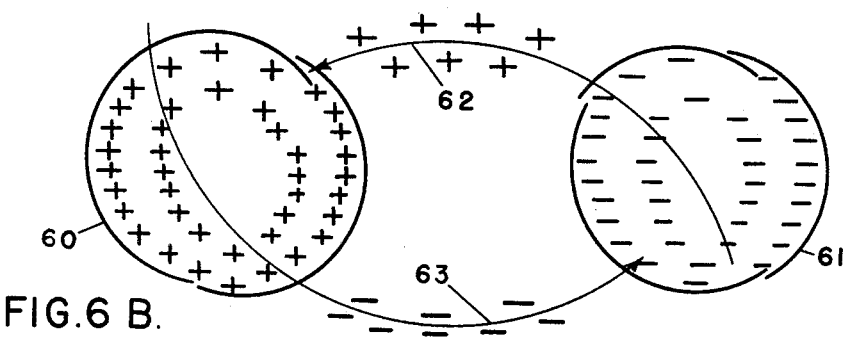

A high wind 50 is blowing across the top of the positive cloud 10 in FIG. 5. This wind is carrying off a stream of air 51 having a large negative charge 52; this process in turn is making the air 53 entering the cloud even more strongly positive.

FIGS. 6A and 6B illustrate a situation in which two clouds 60, 61 of opposite sign are increasing their respective charges because each is drawing in air which has been charged by passing under the other, as indicated by arrows 62, 63. FIG. 6A is a side view, and FIG. 6B is a view of the same clouds looking upwardly from the ground.

These illustrations are designed to show how the movements caused by convective activity may result in the development of large centers of opposite charge. Although the motion of air will sometimes act with, rather than against, the electrical forces, nevertheless, when air masses involved in strong convective activity acquire the large space charges postulated, it appears that in many cases the air will do electrical work leading to lightning.

By making certain assumptions concerning the flux of air into a thunderstorm cell, it is possible to arrive at an estimate of the space charge that would be required to produce the charging currents observed in thunderstorms. If we assume an up draft of the order of 10 m./sec., extending over an area of 100 km.$^2$, this gives an average upward flux of $10^{15}$ cc. of air per second. The average charging rate of a thunderstorm has been estimated to be of the order of 4 amperes, or about $3 \times 10^{19}$ unit charges per second. This would mean that a space charge of the order of 30,000 unit charges per cubic centimeter would be required. Condensation nuclei are usually found in concentrations as high as this, so that singly-charged particles of this sort would usually meet the requirements of the hypothesis. In addition to these particles, it is probable that cloud drops, too, serve as charge carriers having low mobilities.

It follows that electrical storms cannot form if the space charge in the lower atmosphere is below a certain value. It also follows that such storms can be intensified if that space charge is augmented above its normal value. By the methods and means described in the following discussion, the electrical disturbances of the atmosphere may be controlled, i.e. either minimized or neutralized, on the one hand, or augmented, on the other.

As already stated, the electrification of thunderstorms and associated phenomena such as tornadoes is initiated by the small positive space charge normally present in the lower atmosphere, as indicated by the numeral 19 in FIG. 1. By controlling this space charge, I propose to control the electrification of such storms. This can be accomplished in various ways, all of which, broadly speaking, involve introducing into the atmosphere charged particles of one sign or the other, at selected areas and in amounts required to accomplish the desired purposes.

There are a number of methods that can be used, in accordance with the present invention, to introduce space charge into the lower atmosphere for the purpose of modifying the electrical properties of storms. Typical of such methods are the following:

(1) Charge naturally existing aerosol particles in the atmosphere, such as dust, Aitken nuclei, or cloud particles, by corona discharge. The high voltage necessary for producing corona discharge can be derived either from conventional high voltage sources or from the natural gradient existing in the atmosphere. A simple way of employing this technique is to string wires, maintained at a high voltage, above the ground. The natural movement of the air beneath the wires will bring in a constant supply of the particles to be charged.

(2) Produce fine aerosol particles artificially and then charge them by corona discharge. Suitable aerosol particles can be produced by spraying, by condensing a liquid from the vapor phase, or by the chemical reaction of two or more gaseous components to yield a non-volatile product. The aerosol particles produced by furnaces or internal combustion engines can be used as the carriers of charge.

(3) Instead of using corona as the source of fast ions for charging aerosol particles, it is possible to use other sources. For example, a radioactive source, a flame, or a heated filament can be used as a substitute for a corona-producing wire or point.

(4) Aerosol particles comprising a space charge can be electrically charged by other methods than using a charging element of fast ions. For example, the particles can be charged by electrostatic induction or by frictional effects. If aerosol particles are caused to come into momentary contact with a conducting surface in the presence of an electric field, they can be charged inductively. Or, the particles can be frictionally charged by moving them rapidly over a suitable surface.

By placing a number of space charge generators over a large area, the proper amount of negatively charged particles is introduced to neutralize the positive charge normally present in the lower atmosphere. The output of these generators may be controlled manually or automatically so that the electric field at the earth's surface is very nearly zero. This would correspond closely to neutralization of the normal space charge. In order to maintain the neutrality of the atmosphere it will be necessary to neutralize the atmosphere as fast as the wind brings it in and to supply charge at a rate that balances the normal ionosphere-to-earth current. In areas of the large size that it would be necessary to work with the current necessary to neutralize new air coming in is negligible compared to that required to balance ionosphere-to-ground current. About 3 microamperes (i.e. 3 microcoulombs per second) of current in the form of space charge are required for each square mile to be treated under ordinary conditions, although more or less may be advisable as indicated below. In general, less than about one microampere (i.e. one microcoulomb per second) of space charge per square mile is, however, too little to be clearly effective.

The generators are dispersed in a regular grid with one or more generators in each 30 to 100 square miles. On the basis of our present knowledge it appears that the equipment for space charge generators will cost about one to ten dollars per microampere or three to thirty dollars per square mile. It is estimated that the cost of operating the equipment exclusive of the costs of regulation and maintenance would be about one cent per microampere per hour or about three cents per square mile per hour. In order to produce any significant results, the area covered (i.e. the area of the grid) should be at least about 1000 square miles, and preferably in the order of 10,000 square miles. For illustration, the location of one such generator with respect to the system shown in FIG. 1 would be in or above the ground 20 adjacent the numeral 19.

Equipment of the sort used to neutralize space charge could also be used to increase the space charge or to reverse its sign. The quantities of charge necessary to do this would be of the order of two or more times as large as that required to neutralize the atmosphere and the cost per unit area would be correspondingly larger.

If there are strong sources of space charge present such as dust storms, blowing snow, etc., the cost of neutralizing the air would be somewhat larger than the above estimates, which are based on normal conditions. As a rule, however, it is not necessary to go above about 20 microamperes of space charge per square mile.

Still another technique that can be used to reduce the space charge in the lower atmosphere or to neutralize the potential between the earth and the ionosphere is to fly a large number of smal balloons or kites attached to fine wires attached to the ground. A sufficient number of these balloons or kites flown from many points over the land or ocean could be used to reduce the normal space charge. If they are flown at a height of about one thousand feet the wire goes into corona because of the earth's field. The current per kite would presumably be of the order of 10 microamperes. According to this each kite would be able to reduce appreciably the space charge of several square miles.

If a sufficient fraction of the storms over the earth could be electrically inactivated by space charge neutralization, it might be possible to reduce the supply of positive electricity to the ionosphere to such an extent that it would lose its charge. Once this were to happen, no further electrical storms could take place unless perhaps the electrostatic cycle were to become reestablished because of the electrification produced in dust storms or volcanic activity or by other means.

If the primary charging mechanism of electrical storms is at the top of the cloud, then it might be possible to neutralize the ionosphere in the following manner. In regions of the earth where the greatest thunderstorm activity takes place, set up apparatus for generating sufficient negative space charge to give the air mass a negative space charge. Under this condition any thunderstorms that developed would remove positive ions instead of negative ions from the ionosphere. By this technique, it might be possible to use thunderstorms to neutralize the ionosphere.

In speculating about the electrification process it appears that there might be three possible stable electrical modes for the atmosphere: the present positive ionosphere, a neutral ionosphere, and a negative ionosphere. The situation appears to be analogous to a Wimshurst machine which, if unprimed, remains neutral but which can be primed to be either positive or negative. It might well be that the present positive earth's field was established in prehistoric times by some intense volcanic activity or other cause and that it has persisted until now.

A ramification of the foregoing discussion on the control of electrical storms is the possibility originally suggested by Hare[7], that the tornado is an electrical phenomenon. If this is true, then it should be possible to prevent tornadoes by the same methods used to prevent lightning. If nature can produce space charges of the order of $10^8$ drops per cubic centimeter, it can be shown that an air mass of this sort would reach velocities of three hundred miles per hour in falling through the potential drops existing in thunderstorms. I have produced space charges of this order of magnitude on a laboratory scale, hence this suggestion appears to be entirely reasonable.

Further in connection with the development of tornadoes, it appears entirely possible that the electrical energy in a storm can produce high-velocity up drafts as the result of the heating produced by lightning strokes. Flora[8] quotes two different observers who reported that the inside of the tornado appears to be a hollow cylinder illuminated with constant flashes of lightning. It would be expected that the interior of a tornado would offer a low-resistance path for lightning because of its low pressure, and that the heating and ionization produced by lightning would further lower this resistance. If lightning flashes transporting 20 coulombs per stroke occur within the vortex at the rate of one per second, it can be calculated that the energy would be sufficient to produce an increase of about 100° C. in the temperature of a column of air 50 meters in diameter rising at 100 m./sec. If only a portion of the electrical energy developed by a large storm were to be converted into kinetic energy by either of these mechanisms, it could supply ample power for a tornado.

I claim:

1. The process of modifying the existing space charge of the atmosphere, which comprises introducing into the atmosphere adjacent the ground, from a plurality of stations distributed over an area of at least about one thousand square miles, a mass of particles substantially all of which have an electrical charge of one sign, at a rate of between about one and about twenty microamperes per square mile of said area.

2. The process of neutralizing the space charge in an electrical storm in the atmosphere, which comprises introducing into the atmosphere adjacent the ground, from a plurality of stations distributed over an area of at least about one thousand square miles, into a moving stream of

---

[7] Hare, R., 1840: Notices of Tornadoes. Amer. J. Sci. Arts, 38 : 73–86.

[8] Flora, S. D., 1953: Tornadoes of the United States. University of Oklahoma Press, 10.

the atmosphere up-wind from said storm, a mass of negatively-charged particles at a rate of between about one and about twenty microamperes per square mile of said area.

3. The process according to claim 2 wherein said stations are arranged in regular grid formation with at least one of said stations in each one hundred square miles of said area.

4. The process of augmenting the space charge in a selected volume of the atmosphere and thereby increasing the degree of electrical disturbance therein, which comprises introducing into the atmosphere adjacent the ground, from a plurality of stations distributed over an area of at least one thousand square miles, into a moving stream of the atmosphere up-wind from the location of said selected volume of the atmosphere, a mass of positively-charged particles at a rate of between about two and about twenty microamperes per square mile of said area.

5. The process according to claim 4 wherein said stations are arranged in regular grid formation with at least one of said stations in each one hundred square miles of said area.

6. The process of modifying the space charge in an electrical storm in the atmosphere, which comprises introducing into the atmosphere, at points between the surface of the ground and the edge of said storm, and over an area of at least about one thousand square miles, a mass of particles substantially all of which have an electrical charge of the same sign, at a rate of between about one and about twenty microamperes per square mile of said area, said points being so located that said particles are moved toward said storm by the movement of the atmosphere.

7. Apparatus for modifying the existing space charge of the atmosphere, comprising a plurality of electrical charge-generating stations spaced apart over a ground area of at least about one thousand square miles, with at least one of said stations in each one hundred square miles of said area, each of said stations comprising a source of fine particles, charging means for imparting an electrical charge of one sign to said particles, and means for moving said particles past said charging means and into the natural updraft currents of the ambient atmosphere at a rate sufficient to introduce between about one and about twenty microcoulombs per second per square mile of said area.

8. Apparatus for modifying the existing space charge of the atmosphere, comprising a plurality of charge-generating stations spaced apart over a ground area of at least about one thousand square miles, with at least one of said stations in each one hundred square miles of said area, and means associated with each of said stations for discharging into the ambient atmosphere an electrical charge of one sign of between about one and about twenty microcoulombs per second per square mile of said area.

9. Apparatus in accordance with claim 8 wherein said means associated with said stations comprises wires attached to the ground and extending upwardly into the atmosphere, said wires being suspended from supporting means such as kites or balloons.

10. Apparatus in accordance with claim 8 wherein said means associated with said stations comprises wires strung above said ground area and connected to a high voltage source.

References Cited in the file of this patent

UNITED STATES PATENTS

| 1,279,823 | Balsillie | Sept. 24, 1918 |
| 1,284,982 | Balsillie | Nov. 19, 1918 |

FOREIGN PATENTS

| 24,688 of 1905 | Great Britain | Feb. 22, 1906 |

OTHER REFERENCES

Sand-Blasting the Clouds for Man-Made Weather; Scientific American, April 1923, page 224.

Washington Post, Sunday, Aug. 20, 1916, 1 page (page number unknown), "Latest Progress in Turning Rain On and Off at Will," author unknown.

Literary Digest, "The Dispersion of Fog," page 161, Aug. 3, 1907.

"Rain Making and Other Weather Vagaries," by W. J. Humphreys, 1926, pages 58, 59 and 60 (lines 1–3).